B. W. Field
Cotton Bale Tie
Nº 89,136. Patented Apr. 20, 1869.
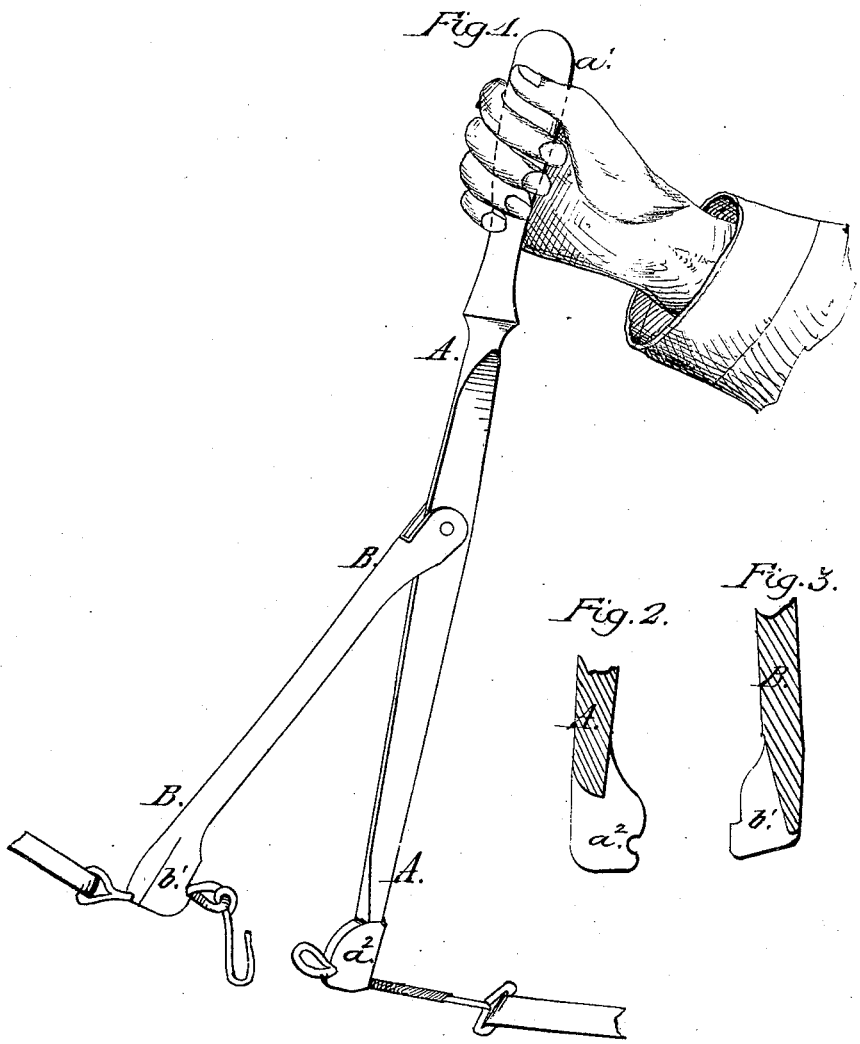
Witnesses:
Inventor:
B. W. Field
by Munn & Co.
attorneys

United States Patent Office.

B. W. FIELD, OF FERRISBURG, VERMONT.

Letters Patent No. 89,136, dated April 20, 1869.

IMPROVED BAND-DRAWER.

The Schedule referred to in these Letters Patent and making part of the same.

*To all whom it may concern:*

Be it known that I, B. W. FIELD, of Ferrisburg, in the county of Addison, and State of Vermont, have invented a new and improved Band-Drawer; and I do hereby declare that the following is a full, clear, and exact description thereof, which will enable others skilled in the art to make and use the same, reference being had to the accompanying drawings, forming part of this specification, in which—

Figure 1 is a side view of my improved band-drawer.

Figures 2 and 3 are detail sectional views of the lower ends or claws of the levers.

Similar letters of reference indicate corresponding parts.

My invention has for its object to furnish a simple, convenient, and powerful instrument for drawing the patent wire-bands, or other bands upon bales of hay, straw, broom-corn, cotton, or other materials put up in bales, and which shall, at the same time, be so constructed as to be conveniently operated; and It consists in the construction of the instrument, as hereinafter fully described.

A represents the main bar, or lever, upon the upper end of which is formed or to it is attached a handle $a^1$.

The lower end of the lever A is slotted, and has notches, or claws $a^2$, formed upon it, to take hold of the band to be drawn.

B is a shorter lever, the upper end of which is pivoted to the main lever A, and its lower end is slotted, and has notches, or claws $b'$ formed upon it, to take hold of the other end of the band to be drawn.

The particular form of the lower ends or claws of the levers A and B will depend upon the form or kind of the band to be drawn, and should be so formed as to take a firm hold of said band.

In using the instrument, the lower ends of the levers A and B are spread apart, and made to take hold of the band to be drawn near its ends.

The upper end or handle of the lever A is then drawn back and downward, drawing the lower ends of the levers A and B toward each other, and with them the ends of the band.

The ends of the band are then secured to each other, and the instrument detached and applied to another band.

It will be observed that the levers A and B operate upon the principle of the toggle-joint, acting with the greatest power as their lower ends approach each other. In this way the bands can be drawn tightly around the bale and secured, so as to confine the bale more closely than is possible when the band is drawn around the bale by hand in the ordinary manner, thus economizing space, and thereby diminishing the cost of freightage and storage.

I claim as new, and desire to secure by Letters Patent—

The arrangement of the handle $A \cdot a^1$, pivoted lever B, and the notched and forked claws $b'\ a^2$, as herein described, for the purpose specified.

The above specification of my invention signed by me, this 29th day of January, 1869.

B. W. FIELD.

Witnesses:
 ZURIEL WALKER,
 ABRAM SATTLES.